United States Patent [19]

Düpree

[11] Patent Number: 4,685,751

[45] Date of Patent: Aug. 11, 1987

[54] OUTWARDLY PULLABLE DRAWER OR SLIDING TRAY FOR FURNITURE

[76] Inventor: Hans-Werner Düpree, Osnabrücker Landstrasse 154, D-4830 Gütersloh 11, Fed. Rep. of Germany

[21] Appl. No.: 729,995

[22] Filed: May 3, 1985

[30] Foreign Application Priority Data

May 5, 1984 [DE] Fed. Rep. of Germany ....... 3416627

[51] Int. Cl.$^4$ ............................................. A47B 48/00
[52] U.S. Cl. .................................. 312/263; 403/381; 403/331; 248/287; 312/330 R
[58] Field of Search .................. 312/330 R, 263, 258, 312/257 A; 403/381, 331, 290, 373; 248/223.4, 224.4, 225.1, 287

[56] References Cited

U.S. PATENT DOCUMENTS 2,519,687 8/1950 Miller ................................. 403/290
4,458,965 7/1984 Ohlendorf .......................... 312/263

Primary Examiner—Kenneth J. Dorner
Assistant Examiner—Gerald A. Anderson
Attorney, Agent, or Firm—Burns, Doane, Swecker & Mathis

[57] ABSTRACT

A furniture drawer with a front cover that is adjustable and fixable in at least one direction includes connecting hardware having at least two forked gripping members disposed a distance apart. The jaws of the gripping members define an insertion slot and can be pressed together by a closing element. An enlarged head of a web member is engaged by the gripping member. The head is narrower than maximum clearance between the jaws when the head member is inserted into the gripping member. Inclined surfaces are disposed in the region of the said jaws immediately behind the insertion slot and immediately behind the head member and cooperate with projections that abut the inclined surfaces. When the jaws are drawn together, clearances are present between the web member and the outer ends of the jaws, as well as between the head member and the interior regions of the jaws. A first fitting piece outside the drawer front is mounted on the back side of the front cover. The inclined surfaces and projections of the forked gripping member and/or head member, respectively, and the distances of those surfaces and projections from the front cover are mutually arranged so that when the head is inserted in the forked gripping member the front cover is forced against the front surface of the drawer.

17 Claims, 13 Drawing Figures

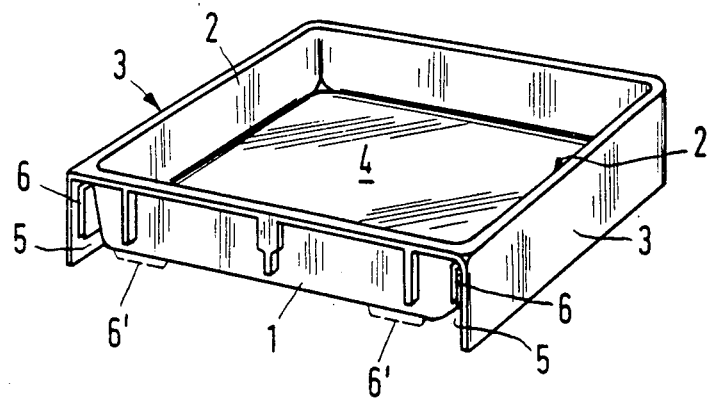
Fig.1
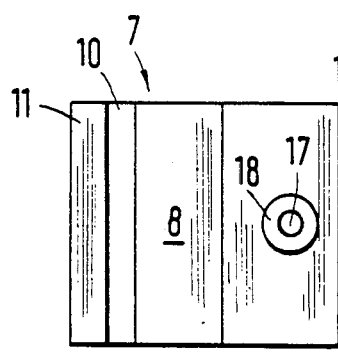
Fig.2
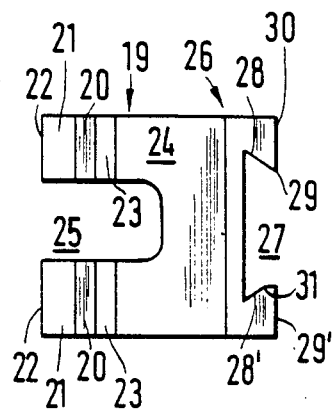
Fig.3
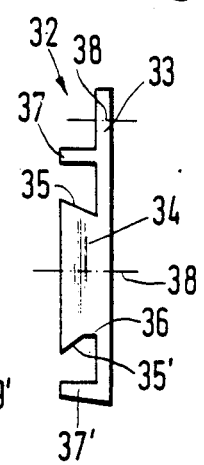
Fig.4
Fig.5
Fig.6
Fig.7

OUTWARDLY PULLABLE DRAWER OR SLIDING TRAY FOR FURNITURE

BACKGROUND OF THE INVENTION

The invention relates to the technology of outward pullable furniture drawers, sliding trays and the like. Specifically, the invention concerns such a drawer with a front cover which cover is adjustable in at least one direction of the main plane of the cover and which can be fixed in position.

Known mounting hardware for attaching a drawer front to a drawer assembly includes a dovetail sliding fixture, with a dovetail groove provided on at least one end with an opening for inserting a dovetail tongue. The grooves and tongues of such mounting hardware are disposed perpendicularly to the bottom of the drawer. Thus, the front cover is adjustable vertically with respect to the drawer.

Other known mounting hardware of the general type described initially above includes a vertically mounted eccentric disc disposed outside each side wall of the drawer. The disc engages a head member mounted on a flexible stem, the head member being attached to the rear side of the front cover. The front cover can then be moved to adjust it with respect to the drawer, by bending the stem between the front cover and the head member.

OBJECTS AND SUMMARY OF THE INVENTION

An object of the invention is to provide an improved set of mounting hardware for attaching a drawer front to a drawer assembly. Preferably the hardware can withstand greater forces, particularly tensile forces, than can known hardware. And the hardware is disposed near the front of the drawer assembly and exterior to the front wall of said drawer assembly. Further, the hardware includes separate guide means for each adjustment direction.

If this known mounting hardware is modified to include a dovetail tongue with a cross section resembling a neck-like member to which a broader head member is attached, and if the hardware is further modified to include a dovetail-like groove configured to provide a passage slot for the tongue where the slot is wider than the neck-like member but narrower than the head member, then the front cover is adjustable not only vertically but also horizontally with resepct to the drawer. The position of the front cover with respect to the drawer may be adjusted and may be fixed in the adjusted position by a clamping or closing screw. The screw engages from the side of the drawer or from below.

An outwardly pullable furniture-type drawer or or sliding tray which achieves this object is characterized by a set of connecting hardware between the front cover and the drawer, including at least two forked gripping members disposed a distance apart, with the jaws of each gripping member defining an insertion slot and being pressable together by means of a closing element. For each such gripping member, the hardware further includes a neck-like web member disposed opposite to, directed toward, and aligned with the said forked gripping member and having an enlarged or thickened head member which is less thick than the maximum clearance between the said jaws when the head is inserted into the gripping member.

Inclined surfaces, which diverge in the direction away from the slot, are disposed in the region of the said jaws immediately inside the insertion slot and immediately behind the enlarged head member. These inclined surfaces cooperate with abutting projections so that when the said jaws are in a drawn-together state, a clearance is present between the said neck-like web member and the outer ends of the said jaws. In addition, there is a clearance between the head member and the interior regions of the said jaws aligned with the head member.

Each such forked gripping member of the hardware further includes a first fitting piece disposed near the front of the drawer and outside the forward wall of the drawer, and a second fitting piece abutting the first and mounted on the rear side of the front cover. The position of the inclined surfaces and projections disposed on the forked gripping member and/or head member, described above, and the distances of said surfaces and projections from the front cover are mutually arranged such that the front cover is forced against the front surface of the drawer, when the head is inserted in the forked gripping member.

The forked gripping members and the head members with neck-like web members may be disposed near the side walls of the drawer and may be in the interstice between double side walls of the drawer. Thus, it is possible for the hardware to be configured such that it is as high as the side walls and has a substantial junction surface area. In this manner, the forces to be transferred between the drawer assembly and the drawer front are broadly distributed and the load per unit surface is low. Alternately, mounting hardware according to the invention may also be disposed below the bottom of the drawer. With such an arrangement, the same advantages of the low load per unit surface may be achieved by configuring the hardware to be wide.

A set of mounting hardware according to the invention allows the front cover to be applied to the drawer in a simple and easy fashion. All that is required to mount the front cover on the drawer is (a) to position the enlarged head members attached to the neck-like web members in front of the insertion slots of the forked gripping members, and (b) then press the front cover against the drawer, so that the heads penetrate through the slots and into the gripping members. During this process, the heads force the jaws of the gripping members apart. The front cover will thereby become held against the front surface of the drawer by the clamping action of the said jaws on the heads. The front cover can then be adjusted in the direction in which the insertion slots run.

After this adjustment, the jaws of the respective forked gripping members are drawn or pressed together by operating the closing element. This closing element acts to pull on the widened head members, thereby pulling the front cover firmly against the front side of the drawer so that the cover is held securely against displacement. The translational movement of the front cover in the direction toward the drawer which occurs is the result of the widened head members gliding over the respective sets of inclined surfaces which are being forced toward each other by the clamping force of the gripping members.

From functional considerations it is only necessary for one of each abutting pair of surfaces in the joint between the forked gripping member and head member to be inclined. Either the surface on the jaw of the gripping member or the surface on the rearward side of the head member can be inclined. In a preferred embodiment, inclined surfaces are provided in both these locations, so that the inclined surfaces can slide over each other. These surfaces may be provided with generally form-interlocking raised elements that are produced by stamping. These elements enhance friction in the adjustment process, whereby the adjusted position is more surely maintained until the above-mentioned closing element is actuated.

The insertion of the head member into the forked gripping member against the spring-loaded clamping action of the latter may be facilitated by configuring the front side of the head member as a wedge, by configuring the surfaces of the forked gripping member ahead of the insertion slot as diverging surfaces open outwardly from the narrow part of the slot in the diection opposite the insertion direction, or by doing both.

A second direction of adjustment for the front cover, namely perpendicularly to the forked gripping members and their insertion slots, is provided by connections in the form of sliding carriage fixtures with guide means, disposed at a distance from the respective forked gripping members and head members. Advantageously, each such connection is in the form of a sliding dovetail arrangement with mutually engaging undercut inclined surfaces. With this arrangement, the neck-like web member of the fitting piece bearing the head member is connected to the front cover by the sliding carriage arrangement.

Alternatively, the base of the gripping member may be connected by means of such a sliding carriage arrangement. This arrangement is particularly useful if the gripping member is to be disposed at the front cover and the head member and neck-like web member are to be mounted on the drawer.

The direction of sliding movement for the sliding carriage arrangement is perpendicular to the longitudinal direction of the insertion slot of the forked gripping member. In this embodiment, the tensile force produced when the head member is drawn into the forked gripping member, particularly when the closing element on the gripping member is tightened, also causes the inclined surfaces of the dovetailed tongue and groove to wedge together and become fixed.

In order to facilitate adjustment and provide holding capability when adjusting the position of the front cover in the direction of the sliding carriage arrangement, form-interlocking generally raised elements may be provided on at least one pair of abutting faces of the sliding carriage arrangement. Preferably such elements are linear, extending in a direction transverse to the sliding direction.

The interfitting pieces of the present invention are preferably disposed in the interstice or space between the inner and outer side walls of the drawer in the case of a double-walled drawer. The elements of the mounting arrangement are narrow, and require little transverse space; thus, this interstice need not appreciably encroach on the usable drawer space even though the interstice also accommodates the customary guide means for the drawer.

To further reduce the width of the interstice, one of the jaws of the forked gripping member preferably the inner jaw, may be configured as an intergral part of the outer surface of the inner side wall of the drawer. When this arrangement is used, the inner jaw of the forked gripping member is preferably integral with the drawer side wall. The spring-loaded clamping action of the gripping member is then accomplished by the other jaw. This embodiment is also particularly advantageous if the mounting arrangement of the present invention is used in connection with a drawer having only a single side wall.

If the closing element of the forked gripping member is in the form of a machine screw passing transversely through the jaws of the gripping member, this screw can be adjusted quite precisely from the side of the drawer. Thus, the tension can be precisely adjusted to cause the front cover to press against the front side of the drawer with the desired force. For example, the top edge of the front side of the drawer assembly may be provided with an outwardly projecting member which serves as the upper contact surface for the front cover, and this member may be configured with a slight outward flexure. When the closing elements on the respective forked gripping members are tightened, causing the said gripping members to exert a resultant tensile force, the initially flexed contact surface is bent inward, tending to straighten it out. In this manner the contact surface deflects so that it presses against the inner surface of the front cover over its entire length.

BRIEF DESCRIPTION OF THE DRAWINGS

The above as well as many other objects and advantages of the invention will be apparent to those skilled in the art when this specification is read in conjunction with the attached drawings wherein like reference numerals have been applied to like elements and wherein:

FIG. 1 is an overall perspective view of an inventive drawer or sliding tray;

FIG. 2 is a side view of a gripping member;

FIG. 3 is a side view of a fitting piece having a neck-like member and a head member;

FIG. 4 is a side view of a guide for permitting sliding movement of the mounting hardware;

FIG. 5 is a top view of the forked gripping member of FIG. 2;

FIG. 6 is a top view of the fitting piece of FIG. 3;

FIG. 7 is a front view of the guide of FIG. 4;

DESCRIPTION OF THE PREFERRED EMBODIMENTS

Figure 8:
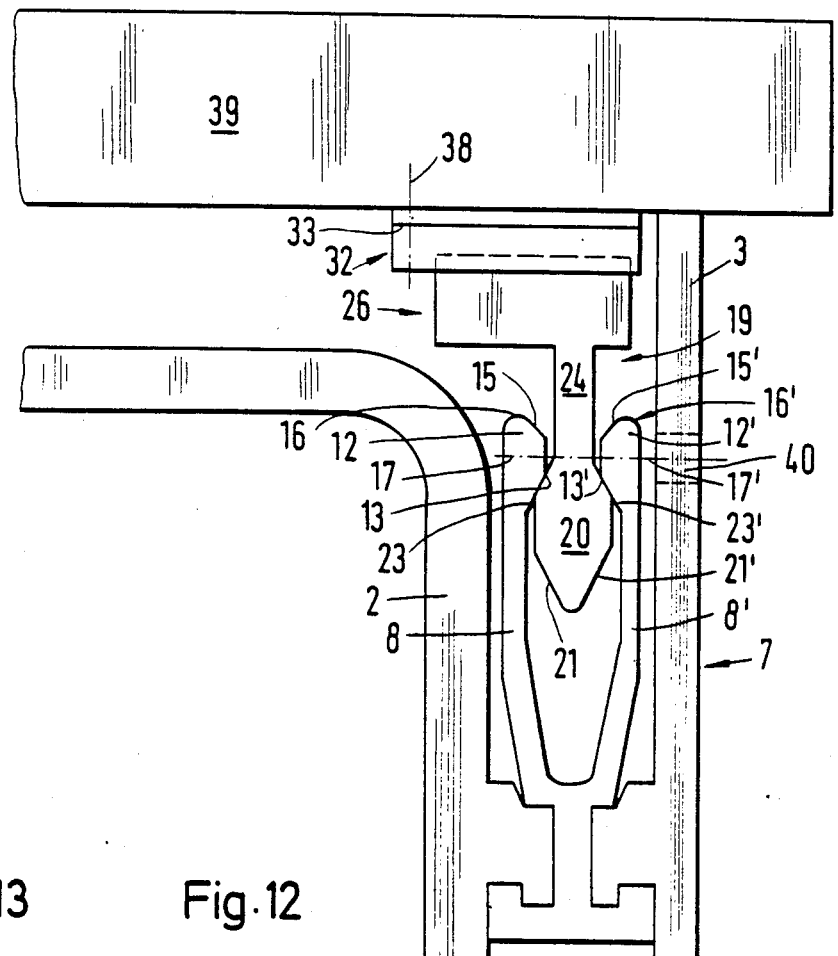
FIG. 8 is an enlarged detail view of a front corner of a drawer with a front cover in place, said drawer employing a set of mounting hardware according to the invention.

A drawer or sliding tray, shown in FIG. 1, is fashioned of plastic material. The drawer includes a continuous uninterrupted forward wall 1, and double side walls 3. Each double side wall 3 includes smooth, continuous interior and exterior side walls 2, 3, respectively. These double side walls 3 are disposed on each of the two sides of the drawer. The drawer further includes a bottom 4.

In the space or interstice 5 between the inner and outer side walls 2, 3, the conventional guide means and support means for the drawer are disposed. One element 6 of the mounting hardware of this invention is preferably positioned on the front side of the drawer in the space 5. A front cover piece (not shown in FIG. 1 for the sake of simplicity) carries another element of the mounting hardware which complementarily engages the first element 6. The fittings 6 disposed in the interstices 5 between the interior and exterior side walls 2, 3 may be alternatively disposed in the location 6' beneath the front wall 1 at the bottom 4 of the drawer, as shown with broken lines in FIG. 1.

A set of mounting hardware according to the invention is shown in more detail in FIGS. 2 to 7. The set of hardware includes a forked gripping member 7 (FIG. 2) with two jaws 8, 8', which are joined at their base by a transverse web member 9 (FIG. 5). The transverse web member 9 is integrally joined to a supporting web member 10 which is connected to a securing web member 11.

At the open end of the forked gripping member 7 two interiorly directed projections 12, 12' are provided, each projection 12, 12' being located on a corresponding one of the jaws 8 and 8'. These projections are provided with inclined surfaces 13 and 13' which are inclined such that they mutually diverge in the direction of entry into the gripping member 7. An insertion gap or slot 14 is disposed between the projections 12, 12' thus defining a clearance therebetween. In addition, a second set of inclined surfaces 15, 15' are located on the jaws 8, 8'. This second set of inclined surfaces 15, 15' diverges outwardly away from the insertion gap 14 and away from the apices of the projections 12, 12'. Thus, the surfaces 15, 15' mutually diverge with progression from the apices to the distal end edges 16, 16' of the jaws 8, 8'.

An opening 17, 17' is provided in the middle of each gripping member 7 (FIG. 2) at a short distance from each distal end edge 16, 16' of the two corresponding jaws 8, 8'. Each perforation or opening 17, 17' is surrounded by a corresponding reinforcement 18, 18' in the corresponding jaw 8, 8'. Advantageously, the opening 17, 17' in one or the other of the jaws 8, 8! is provided with an interior thread to engage a machine screw or the like [not shown]. The machine screw may be inserted through said openings 17, 17' to serve as a closing element or detent element. In such an arrangement, the screw may be disposed with its head on the outer surface of the jaw 8' so that its shank passes through the opening 17' in the jaw 8' and thence into the interior thread in the opening 17 in the opposite jaw 8. It may be seen that such a machine screw may be employed to draw the two jaws 8, 8' together.

Another element of the mounting hardware is illustrated in FIGS. 3 and 6. This element or first fitting piece 19, includes a thickened or enlarged head member 20 having inclined surfaces 21, 21' which converge to the front edge 22 to form a wedge-shaped ridge configuration. Two additional inclined surfaces 23, 23' are provided on the rear side of the head member 20. The additional inclined surfaces 23, 23' converge equiangularly with progression from the thickest part of the head 20 rearwardly until they merge into a neck-like web member 24. The web member 24 is only a fraction as thick as the head member 20. The length of the piece 19 is approximately the same as the length of the gripping member 7.

An intermediate or divided recess 25 (FIG. 3) is provided in the piece 19 in the region of the head 20 and part of the rearwardly adjoining web member 24. This recess corresponds to the location of the opening 17 and the surrounding reinforcement 18 in the jaws 8, 8' of the gripping member 7. Accordingly a forked structure is formed in the piece 19, with the recess 25 being wider than the diameter of the reinforcement 18 surrounding the opening 17.

At the end of the web member 24 opposite to the end having the head 20, the web member 24 merges into a foot member 26 which has a rectangular cross section (FIG. 6). The foot member 26 is one part of, namely the sliding carriage assembly of, a sliding carriage fixture which cooperates with guide means of a mounting plate 32. The sliding carriage fixture has a dovetail configuration (FIG. 3). The foot member 26 bears a dovetail groove 27 bordered by inclined surface 28, 28' which tend to converge in the direction away from the body of the foot member 19. The terminus of the inclined surface 28 is a sharp edge 29 which adjoins a positioning surface 30 of the fitting piece 19. The end of the other inclined surface 28' has a transition through an oblique angle to a short surface 31. This short surface 31 in turn adjoins a positioning surface 29', with the angle between the short surface 31 and the positioning surface 29' being a right angle. The surfaces 30, 29' are coplanar.

The mounting plate or second fitting piece 33 has dovetail tongue 34 with an inclined surface 35' that undergoes a corresponding transition to a short surface 36 which is generally perpendicular to the plane of the mounting plate 33. The inclined surfaces 28, 35, on the one hand, are somewhat different from inclined surfaces 28', 35' on other hand. The inclined surfaces 28', 35' are associated with the corresponding horizontal surfaces 31, 36. This arrangement ensures that there is only one way of assembling the two parts 19, 32 of the sliding carriage fixture with guide means.

In addition to the dovetail tongue 34, cantilever members 37, 37' are provided on the mounting plate 33 which extend generally perpendicularly from the mounting plate 33. These cantilever members 37, 37' serve to bound the forminterlocking parts of the fixture and to cover the inclined surfaces 35 and 35'. The cantilever members 37, 37' overlap the exterior surfaces of the foot member 26 of the fitting piece 19 after the dovetail groove 27 is mounted on the dovetail tongue 34. At least two openings 38, the centers of which are indicated by center lines in FIGS. 4 and 7, are provided in the mounting piece 32. These openings pass through the mounting plate and serve to accept attachment machine screws or the like, not shown. Such machine screws are installed in the openings 38 to attach the fitting piece 32 to the back side of the above-mentioned front cover piece of the drawer.

In FIG. 8 a forward corner of a drawer is shown with the front cover 39 attached to a front surface of the drawer. The piece 32 having the dovetail tongue has been mounted on the cover 39 by means of the mounting plate 33. To attached the front cover to the drawer, the piece 32 is secured by machine screws or the like passing through the openings 38. The foot member 26 of the element 19 is attached to the piece 32 by sliding the dovetail groove 27 over the dovetail tongue 34 of the mounted piece 32. The forward ridge 22 of the thickened head member 20 carried on the neck-like web member 24 is pushed against the inclined surfaces 15, 15' and into the insertion slot 14 formed by the jaws 8, 8' of the gripping member 7.

The head member 20 moves against strong resistance into said slot between said jaws. The jaws yield elastically outward, and with their inwardly directed projections 12, 12', the jaws 8, 8' are pushed apart by the inclined surfaces 21, 21' on the forward side of the head member 20, allowing the head member 20 to pass between the projections 12, 12', after which the jaws again converge.

After this penetration of the head member 20, the inclined surfaces 13, 13' are disposed on the inside of the projections 12, 12', as shown in FIG. 8. That is, the inclined surfaces 23, 23' on the back side of the projections 12, 12' rest on the back side of the head member 20 such that the directions of the surfaces 13, 23 and the directions of the surfaces 13', 23' coincide, as shown in FIG. 8. It will be seen that free lateral space remains ahead of and behind the inclined surfaces 13, 13', 23, 23'. That is, there is a lateral space between the jaws 8, 8' and the head member 20, as well as a lateral space between the projections 12, 12' on the jaws 8, 8' and the neck-like web member 24.

With the head member 20 thus engaged between the jaws 8, 8', the front cover 39 rests against the forward edge of the outer side wall 3 and against other front surfaces of the drawer assembly which are disposed forward of the front wall 1 of the drawer. The clamping force acting on the inclined surfaces 13, 13', 23, 23' by the jaws 8, 8', produces a resultant which tends to draw the head member 20 farther into the forked gripping member 7. In this manner the front cover 39 is pulled firmly against the front surfaces of the drawer assembly.

In this position, the front cover 39 can be moved relative to the drawer assembly for adjustment purposes. In particular, the head member 20 can slide upwardly out of the plane of FIG. 8 and downwardly into the plane of FIG. 8 by moving while held between the jaws 8, 8' of the gripping member 7. In addition, the sliding carriage arrangement between the dovetail tongue 34 and the dovetail groove 27 allows horizontal adjustment of the front cover 39 within the plane of FIG. 8.

After the desired adjustment of the front cover 39 with respect to the main body of the drawer is achieved, machine screws are installed in the openings 17, 17' of the forked gripping member 7 and are tightened with a screwdriver that may be inserted through an opening 40 in the outer side wall 3. Tightening the machine screws draws the two jaws 8, 8' of the gripping member 7 together so that the inclined surfaces 13, 13', 23, 23' slide over each other, and the head member 20 of the fitting piece 19 is pulled still farther into the forked gripping member 7. In this way the front cover 39 is caused to press still harder against the associated front surfaces of the drawer assembly against which the front cover has been pressing during the positional adjustment.

In addition, when the screws are tightened, the dovetail groove 27 of the sliding carriage 32 is pulled away from the dovetail tongue 34. Here again there is sliding of the sliding surfaces 28, 35, 28', 35' over each other, resulting in a clamping action which inhibits or prevents further sliding of the inclined surfaces in the adjusting direction, namely, along the longitudinal length of the tongue 34 in the plane of FIG. 8.

The abutting inclined surfaces of the individual guide elements in the forked gripping member 7 and in the sliding carriage fixture with guide means 19, 32 may be provided with mutually engaging linear raised elements, running transversely to the direction of adjustment. These raised elements and provides an end detent that hinders any additional back and forth movement in the direction of adjustment when the individual parts are pressed against each other during the tightening operation. The mutual engagement of the abutting sets of raised elements on the inclined surfaces is generally forminterlocking, such as to prevent further sliding in the adjustment direction after the machine screw is tightened such that the normal force component pressing the abutting inclined surfaces together reaches a certain modest value effectively preventing further sliding.

Readjustment of the pieces 7, 19, 32 of the mounting hardware with respect to each other is possible only after the machine screw has been loosened in the openings 17, 17' of the forked gripping member 7. When loosened, essentially the only force in the downward direction of FIG. 8 pulling the front cover 39 is that engendered by the spring action of said gripping member 7.

It may be seen that, for a case in which it is considered sufficient for the front cover to be adjustable in only one direction with respect to the drawer or sliding tray, the sliding carriage arrangement 26, 32 may be eliminated. Accordingly, the head member 20 with neck-like member 24 can be attached directly to the back side of the front cover 39 by the foot 26 which may then have a simple rectangular shape.

Figure 9:
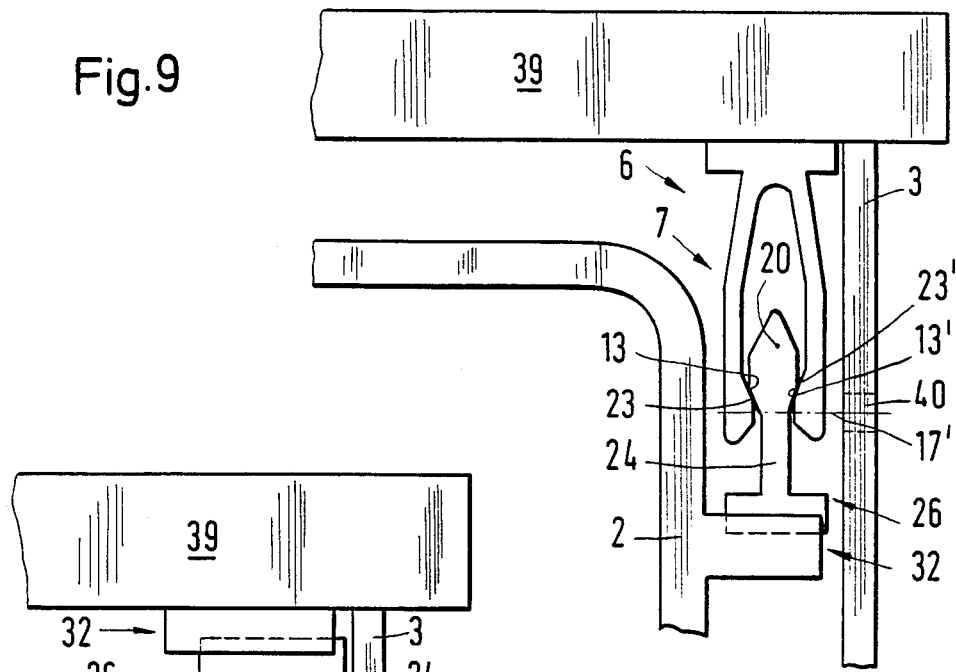
FIG. 9 is a second embodiment of a set of mounting hardware.

In the exemplary embodiment according to FIG. 8, the securing web member 11 of the forked gripping member 7 is installed in a matching guide configuration in the interstice between the side walls 2, 3. In a different exemplary embodiment (FIG. 9), the forked gripping member 7 is furnished with a simple foot in the form of a mounting plate to attach the member 7 to the back side of the front cover 39. In addition, the head member 20 with the neck-like member 24 rests on a foot 26 shaped like the element 26 in FIG. 3. That foot 26 engages a corresponding piece analogous to element 32 in FIG. 4. That corresponding piece analogous to guide element 32 is formed on the outer surface of the interior side wall of the drawer.

Figure 10:
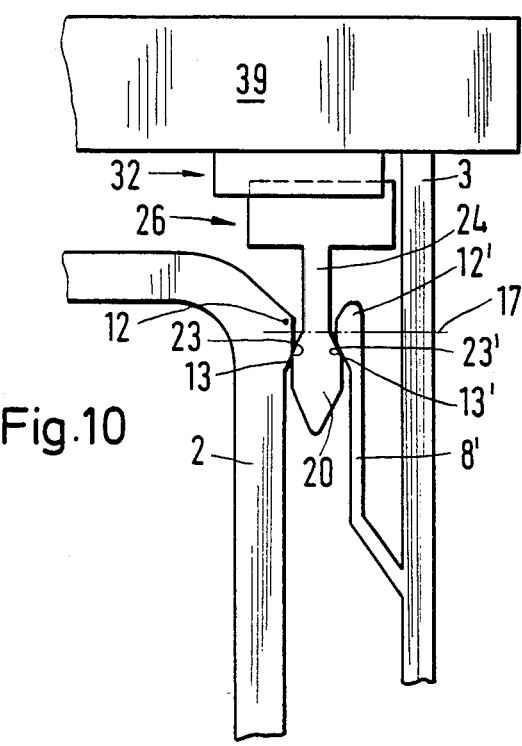
FIG. 10 is a third embodiment of a set of mounting hardware.

In the exemplary embodiment according to FIG. 10, the head 20 with neck-like member 24 is connected to the back side of the front cover 39 by a sliding carriage fixture with guide means similarly to FIG. 8, but one of the jaws 8 of the forked gripping member, and the projection 12 thereon, are integrally formed in the outer surface of the inner side wall 2. Thus the projection 12 is fixed more or less rigidly as part of the drawer structure 2. The other jaw 8' has spring properties and is disposed, along with its corresponding projection 12', on the inner side of the outer side wall 3.

Figure 11:
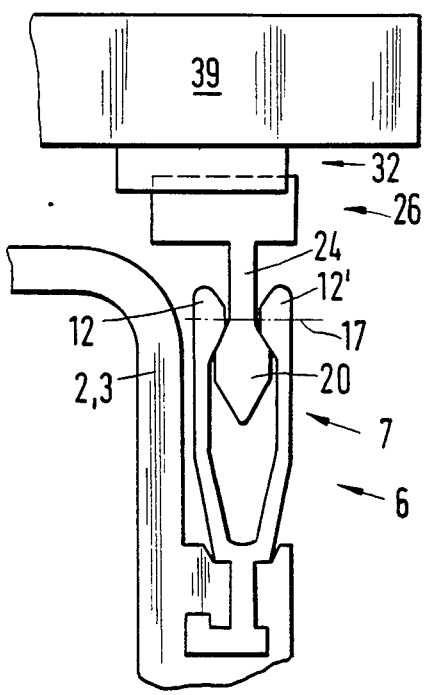
FIG. 11 is a fourth embodiment of a set of mounting hardware.

In a still different exemplary embodiment (FIG. 11), the sliding carriage fixture with guide means is disposed essentially the same as in the exemplary embodiment according to FIG. 8, but the drawer has only a single side wall. The mount for the forked gripping member is disposed on the outer side of this side wall 2.

Figure 12:
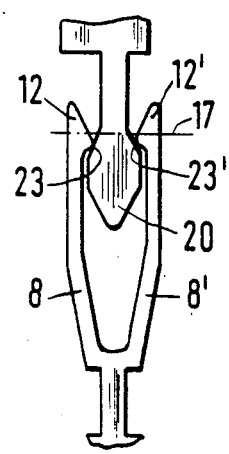
FIG. 12 is a fifth embodiment of a set of mounting hardware.

FIG. 12 illustrates that it is not absolutely necessary for inclined surfaces 13, 13' of FIG. 8 to be provided on the interior side of the projections 12, 12' of the jaws of the forked gripping member. It is sufficient for these projections 12, 12' each to have an angular configuration while the back sides of the head member 20 are still provided with inclined surfaces 23, 23'. The elastic clamping action of the jaws of the forked gripping member draws the head into the gripping member in this embodiment also. And when the machine screw acting as a closing element is subsequently tightened, the force of this tension is increased.

Figure 13:
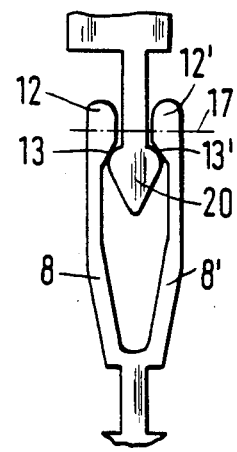
FIG. 13 is a sixth embodiment of a set of mounting hardware.

As shown in FIG. 13, the kinematically reversed situation of that illustrated in FIG. 12 may be employed also. For example, the inclined surfaces 13, 13' are provided on the back sides of the projections 12, 12' of the jaws of the gripping member, but the back sides of the head member 20 are only provided with curved surfaces or sharp-angled ridges.

It will now be apparent that an attachment device for connecting a drawer front to a drawer has been disclosed which meets the objects set forth and which overcomes problems heretofore experienced with the prior art devices. Moreover, it will be apparent to those skilled in the art that numerous modifications, variations, substitutions, and equivalents exist for features of the invention. Accordingly, it is expressly intended that all such modifications, variations, substitutions, and equivalents which fall within the spirit and scope of the appended claims be embraced thereby.

What is claimed is:

1. A drawer assembly comprising:
   a drawer having a forward wall;
   a front cover for the drawer;
   a set of hardware for connecting the drawer with the front cover, such that the front cover is fixable in at least one direction in the main plane of the extent of the front cover;
   at least two forked gripping members disposed a distance apart, each gripping member having a pair of jaws and being attached to one of the drawer and the front cover, the jaws of each gripping member defining an insertion slot and a clearance between the jaws;
   a closing element connected to the jaws and operable to be tightened so as to press the jaws together so as to fix the front cover to the drawer;
   a neck-like web member for each such gripping member, disposed in the insertion slot of the corresponding forked gripping member, disposed opposite to, and aligned with the corresponding forked gripping member and bearing a thickened head member having a thickness less thick than the maximum clearance between the said jaws when the head member is inserted into the gripping member;
   inclined surfaces between the thickened head member and the neck-like web member, positioned on one of the web member and the gripping member, located immediately behind the head member, and in an interior region between the said jaws immediately behind the insertion slot, which inclined surfaces cooperate with abutting projections, so that when said jaws are pressed together, clearances are present between said neck-like web member and outer ends of the said jaws, and between the head member and the interior regions of the said jaws, which interior regions are aligned with the head member; and
   a first fitting piece on each forked gripping member, disposed at the front of the drawer and closely adjacent to the forward wall of the drawer, and a second fitting piece for each forked gripping member, the second fitting piece slidably carrying the first fitting piece and being mounted on the rear side of the front cover, the positions of the inclined surfaces and projections disposed on the forked gripping member and head member and the distances of said inclined surfaces and projections from the front cover being mutually arranged such that, with the head inserted in the forked gripping member, the front cover is adjustably held against the front surface of the drawer and such that, with the closing element tightened, the front cover is fixed against the front surface of the drawer.

2. A drawer according to claim 1, wherein the inclined surfaces are disposed on the rear side of each head member abutting the forked gripping member, and wherein the gripping members include engaging surfaces disposed behind their forward edges which engage surfaces of the head member by engaging the back side of said head member.

3. A drawer according to claim 1, wherein matching inclined surfaces are provided on the head members and on the forked gripping members, said surfaces matching in their inclined position.

4. A drawer according to claim 1 wherein a wedge-shaped surface is provided on the front side of each head member, and wherein the wedge apex runs parallel to the insertion slot of the forked gripping member.

5. A drawer according to claim 1 wherein divergent surfaces are provided on the jaws of the forked gripping members, outside the insertion slot.

6. A drawer according to claim 1 wherein one of the forked gripping member and the head member with neck-like web member is attached to a side wall of the drawer.

7. A drawer according to claim 1, wherein at least one of the jaws of the gripping member is an integral part of a side wall of the drawer.

8. A drawer according to claim 1, wherein one of the forked gripping member and the head member with neck-like web member is disposed in the interstice between double side walls of the drawer.

9. A drawer according to claim 1 wherein one of the forked gripping member and the head member with neck-like web member is disposed beneath the bottom of the drawer.

10. A drawer according to claim 1, wherein the closing element for pressing together the jaws of the forked gripping member comprises a tightening screw which passes transversely through the gripping member in the region near the insertion slot provided in said gripping member.

11. A drawer according to claim 10, wherein the neck-like member and the head member are provided with an intermediate recess approximately centrally therein, and the tightening screw of the forked gripping member is disposed in this dividing recess.

12. A drawer according to claim 1 wherein the mutually abutting parts of the head member and the forked gripping member are furnished with raised elements which run perpendicularly to the longitudinal direction of the insertion slot.

13. A drawer according to claim 1 wherein the mutually abutting parts of the sliding carriage with guide means are provided with raised elements which run perpendicularly to the main direction of extent of the said guide means.

14. A drawer according to claim 1 wherein an end detent is provided in the forked gripping member for limiting the sliding movement of the inserted head member.

15. A drawer according to claim 1 wherein an end detent is provided on the sliding carriage fixture with guide means for limiting the sliding movement of the sliding carriage arrangement.

16. A drawer assembly comprising:
a drawer having a forward wall;
a front cover for the drawer;
a set of hardware for connecting the drawer with the front cover, such that the front cover is fixable in at least one direction in the main plane of the extent of the front cover;
at least two forked gripping members disposed a distance apart, each gripping member having a pair of jaws and being attached to one of the drawer and the front cover, the jaws of each gripping member defining an insertion slot and a clearance between the jaws;
a closing element connected to the jaws and operable to be tightened so as to press the jaws together so as to fix the front cover to the drawer;
a neck-like web member for each such gripping member, disposed in the insertion slot of the corresponding forked gripping member, disposed opposite to, and aligned with the corresponding forked gripping member and bearing a thickened head member having a thickness less thick than the maximum clearance between the said jaws when the head member is inserted into the gripping member;
inclined surfaces between the thickened head member and the neck-like web member, positioned on one of the web member and the gripping member, located immediately behind the head member, and in an interior region between the said jaws immediately behind the insertion slot, which inclined surfaces cooperate with abutting projections, so that when said jaws are pressed together, clearances are present between said neck-like web member and outer ends of the said jaws, and between the head member and the interior regions of the said jaws, which interior regions are aligned with the head member; and
a first fitting piece on each forked gripping member, disposed at the front of the drawer and closely adjacent to the forward wall of the drawer, and a second fitting piece for each forked gripping member, the second fitting piece slidably carrying the first fitting piece and being mounted on the rear side of the front cover, the positions of the inclined surfaces and projections disposed on the forked gripping member and the head member and the distances of said inclined surfaces and projections from the front cover being mutually arragned such that, with the head inserted in the forked gripping member, the front cover is adjustably held against the front surface of the drawer and such that, with the closing element tightened, the front cover is fixed against the front surface of the drawer;
wherein each neck-like web member has a free end which bears a head member and is connected to a base support by a sliding carriage having guide means disposed perpendicularly to the slot of the forked gripping member.

17. A drawer according to claim 16, wherein the sliding carriage with guide means is shaped as a sliding dovetail arrangement with mutually engaging undercut inclined surfaces.

* * * * *